Perrine & Conover,
Potato Assorter.
No. 87,001. Patented Feb. 16, 1869.
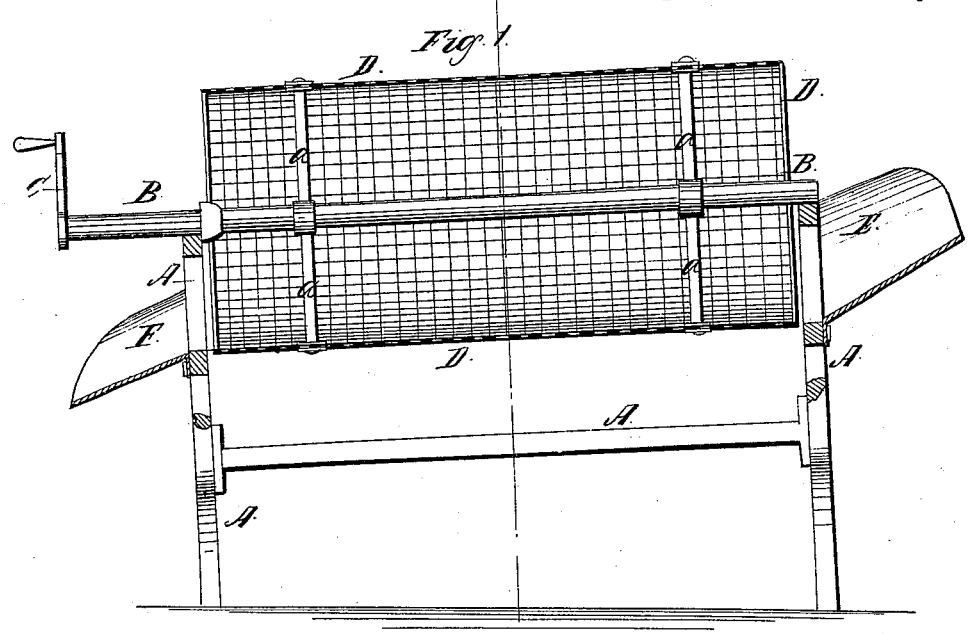
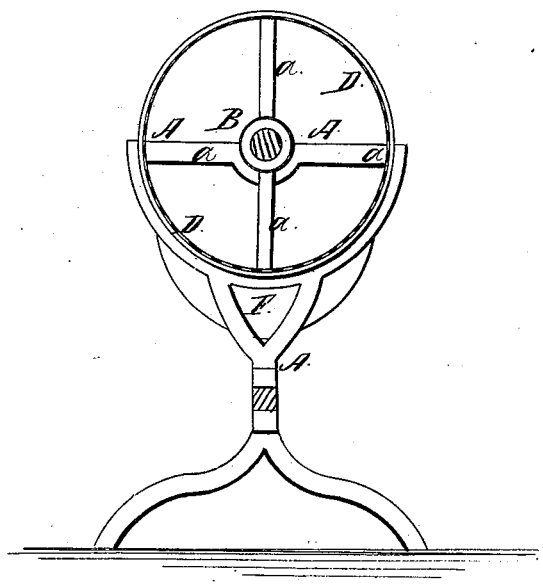
Witnesses:
Wm A Morgan
G C Cotton
Inventors:
L Perrine
P G Conover
per Munn & Co
Attorneys

LEWIS PERRINE AND PETER G. CONOVER, OF FREEHOLD, NEW JERSEY.

Letters Patent No. 87,001, dated February 16, 1869.

IMPROVEMENT IN POTATO-ASSORTER AND SIFTER.

The Schedule referred to in these Letters Patent and making part of the same.

*To all whom it may concern:*

Be it known that we, LEWIS PERRINE, and PETER G. CONOVER, of Freehold, in the county of Monmouth, in the State of New Jersey, have invented a new and useful Improvement in Potato-Assorter and Sifter; and we do hereby declare that the following is a full, clear, and exact description thereof, which will enable others skilled in the art to make and use the same, reference being had to the accompanying drawings, forming part of this specification, in which—

Figure 1 represents a vertical longitudinal section of our improved potato-sorter and sifter.

Figure 2 is a vertical transverse section of the same.

Similar letters of reference indicate like parts.

This invention relates to an improvement in machines for sorting and sifting potatoes; and It consists in the combination of the hopper and discharge-spout, with the inclined revolving sieve, said hopper and spout being arranged upon opposite ends of the sieve.

A, in the drawing, represents a frame, made of wood or other suitable material, of suitable form and size.

It has two uprights, which form the bearings for an inclined shaft, B, which has a crank, C, at or near its lower end.

On the shaft B are mounted projecting arms *a a*, which serve to hold a perforated cylinder, D, as shown, said cylinder having open ends.

The cylinder D is made of wire gauze, or of perforated sheet-metal, or of wooden or other laths, or of any other suitable material, so as to be perforated sufficiently to allow small potatoes to pass through its apertures.

Opposite the higher end of the cylinder, is fixed to the frame A, a hopper, E; and opposite the lower end of the cylinder, is on the frame A, a spout, F.

The potatoes to be sifted are thrown into the hopper, and are, when the shaft is turned, fed down in the cylinder, the smaller ones falling through the sides of the cylinder, while the larger ones pass into the spout, and thence into a suitable receptacle.

The crank being near the spout, the person turning it can easily examine the potatoes that enter the spout, to pick out and throw away those that are bad and rotten.

The machine is portable, can be easily and cheaply made, and is of very simple construction.

Having thus described our invention,

We claim as new, and desire to secure by Letters Patent—

The combination of the frame A, hopper E, and spout F, with the inclined revolving sieve D, said hopper and spout being arranged at opposite ends of the sieve, as herein described, for the purpose specified.

The above specification of our invention signed by us, this 23d day of July, 1868.

LEWIS PERRINE.
PETER G. CONOVER.

Witnesses:
  FRANK BLOCKLEY,
  ALEX. F. ROBERTS.

*Said L. Perrine having assigned his right to J. Mount, of Monmouth County, New Jersey.*